No. 851,376. PATENTED APR. 23, 1907.
E. RENAULT.
APPARATUS FOR DESTROYING PLANT LIFE.
APPLICATION FILED DEC. 15, 1906.

UNITED STATES PATENT OFFICE.

EDWARD RENAULT, OF WALDO, FLORIDA.

APPARATUS FOR DESTROYING PLANT-LIFE.

No. 851,376.  Specification of Letters Patent.  Patented April 23, 1907.

Application filed December 15, 1906. Serial No. 347,954.

*To all whom it may concern:*

Be it known that I, EDWARD RENAULT, a citizen of the United States, residing at Waldo, in the county of Alachua and State of Florida, have invented certain new and useful Improvements in Apparatus for Destroying Plant Life, of which the following is a specification.

My invention relates to an improved apparatus for treating water plants.

The plant known as the water hyacinth is a movable floating vegetable having long tangled roots extending beneath the surface of the water and bulb like tops and flowers above the water surface. The plant, the flowers of which seed quickly, spreads rapidly and is found in vast groups or clusters, which are susceptible to the action of wind, tide, and currents. When the plant appears in navigable waters, it is a source of great annoyance to navigators, fouling the bottoms of shipping, tangling in the steering and propelling gear and impeding progress generally.

The water hyacinth constitutes a fairly good cattle food, and one for which cattle are very eager. It has heretofore been proposed to poison the plant and thus provide for its removal, but there is serious objection to the plan owing to the fact that in poisoning the plant the water is also fouled the use of the plant as a cattle food is destroyed, and in addition there is presented the danger of cattle consuming the poisoned plant when it drifts or is otherwise carried ashore.

The invention consists in the apparatus hereinafter described, illustrated in the accompanying drawings, and particularly pointed out in the claims hereto appended.

Figure 1:
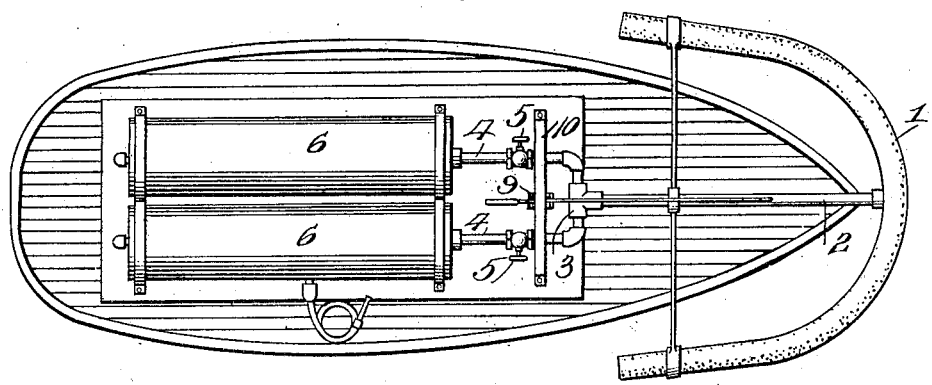
Figure 2:
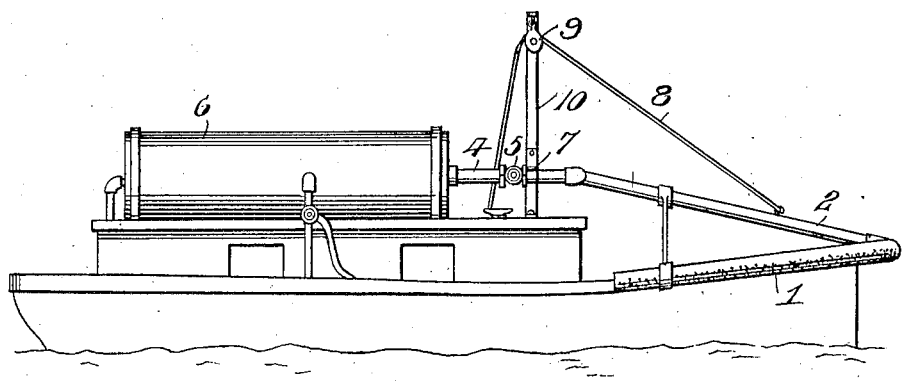

In the accompanying drawings, Figure 1 is a top plan view. Fig. 2 is a side elevation.

For an understanding of my apparatus reference is made to the following detail description of the drawing, which illustrates the apparatus as applied to a steamboat or tug and wherein like reference characters designate corresponding parts throughout the several views. The apparatus comprises a curved perforated hollow sprinkler number 1, arranged to extend around the bow of the boat at either side thereof. Rigidly connected to the sprinkler is a conveyer number 2 extending rearwardly from and being provided with a T coupling 3, in which are fitted the offset ends of conveyor pipes 4, which are provided with cocks 5, and lead to boilers 6. The pipes 4 near their offset ends, are clamped by suitable brackets 7 to the deck and the connection between the offset ends of the pipes 4 and the T couplings is turned on the ends of pipes 4 as a pivot, thus providing a simple arrangement whereby the sprinkler number 1 can be raised or lowered to adjust its angle by means of a rope 8 passing over pulleys 9 mounted in a frame 10. The boilers 6 constitute the means for supplying hot water and steam, which is conveyed therefrom by the steam force therein to the sprinkler by the conveyer pipes 4 and conveyer number 2.

What I claim is:

1. In combination with a portable member, a reservoir carried thereby, a sprinkler, a discharging means for the reservoir, a pipe pivotedly held by the discharge means at one end, the opposite end of the pipe communicating with the sprinkler, braces between the sprinkler and pipe, said pipe and braces supporting the sprinkler and means for moving the pipe on its pivot.

2. In combination with a portable member, a reservoir carried thereby, a sprinkler, a discharging means for the reservoir, a pipe pivotedly held by the discharge means at one end, the opposite end of the pipe communicating with the sprinkler, braces between the sprinkler and pipe, said pipe and braces supporting the sprinkler, a frame and a flexible connection secured to the pipe and engaging the frame for moving said pipe on its pivot.

In testimony whereof he has affixed his signature, in presence of two witnesses.

EDWARD RENAULT.

Witnesses:
J. W. BLANDING,
T. B. ELLIS, Jr.